US012739733B2

(12) United States Patent
Foti

(10) Patent No.: US 12,739,733 B2
(45) Date of Patent: Sep. 15, 2026

(54) NETWORK SLICE ADMISSION CONTROL

(71) Applicant: Telefonaktiebolaget LM Ericsson (publ), Stockholm (SE)

(72) Inventor: George Foti, Dollard Des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 329 days.

(21) Appl. No.: 18/568,215

(22) PCT Filed: May 30, 2022

(86) PCT No.: PCT/EP2022/064582
§ 371 (c)(1),
(2) Date: Dec. 7, 2023

(87) PCT Pub. No.: WO2022/258415
PCT Pub. Date: Dec. 15, 2022

(65) Prior Publication Data

US 2024/0276350 A1 Aug. 15, 2024

Related U.S. Application Data

(60) Provisional application No. 63/209,025, filed on Jun. 10, 2021.

(51) Int. Cl.
*H04W 48/08* (2009.01)

(52) U.S. Cl.
CPC .................................. *H04W 48/08* (2013.01)

(58) Field of Classification Search
None
See application file for complete search history.

(56) References Cited

U.S. PATENT DOCUMENTS

2019/0281494 A1* 9/2019 Chan ..................... H04L 45/851
2019/0357130 A1* 11/2019 Garcia Azorero ...... H04W 4/18
2023/0145595 A1* 5/2023 Lee ....................... H04W 12/06
370/328

FOREIGN PATENT DOCUMENTS

TW 201834496 A 9/2018

OTHER PUBLICATIONS

3GPP TS 23.503 V16.4.1 (Apr. 2020) (115 pages).
International Search Report and Written Opinion issued in International Application No. PCT/EP2022/064582 Sep. 22, 2022 (12 pages).
Nec et al., "TS23.502 KI#2 Network Slice Admission Control Function (NSACF) services and procedures", S2-2104082, 3GPP TSG-SA WG2 Meeting #145E e-meeting, Elbonia, May 17-28, 2021 (5 pages).

(Continued)

*Primary Examiner* — Idowu O Osifade
(74) *Attorney, Agent, or Firm* — Rothwell, Figg, Ernst & Manbeck, P.C.

(57) ABSTRACT

A method (300) performed by a first management function The method includes determining whether or not to trigger a network slice access control function (NSACF) procedure. The method also includes, after determining to trigger the procedure, transmitting a first request message to an NSACF, the first request message comprising: i) a network slice ID, ii) a UE ID, and iii) a first session ID. The method also includes receiving a response message transmitted by the NSACF.

20 Claims, 6 Drawing Sheets

(56) References Cited

OTHER PUBLICATIONS

Nec et al., "TS 23.502 KI#4 NSACF event notification services and procedures", S2-2103479, 3GPP TSG-SA WG2 Meeting #144E e-meeting, Elbonia, Apr. 12-16, 2021 (14 pages).
Ericsson et al., "TS23.502 KI#1 Network Slice Admission Control Function (NSACF)—Result Update", S2-2103805 (was S2-2102209), 3GPP TSG-SA WG2 Meeting #145E e-meeting, Elbonia, May 17-28, 2021 (6 pages).
3GPP TS 23.501 V16.4.0 (Mar. 2020) (430 pages).
3GPP TS 23.502 V17.0.0 (Mar. 2021) (646 pages).
3GPP TS 23.501 V17.0.0 (Mar. 2020) (489 pages).
3GPP TS 23.502 V16.4.0 (Mar. 2020) (582 pages).
3GPP TS 24.501 V16.4.1 (Apr. 2020) (686 pages).
3GPP TS 23.503 V16.4.0 (Mar. 2020) (115 pages).
3GPP TR 23.700-40 V0.4.0 (Jun. 2020) (143 pages).

* cited by examiner

NETWORK SLICE ADMISSION CONTROL

CROSS REFERENCE TO RELATED APPLICATIONS

This application is a 35 U.S.C. § 371 National Stage of International Patent Application No. PCT/EP2022/064582, filed 2022 May 30, which claims priority to U.S. provisional patent application No. 63/209,025, filed on 2021 Jun. 10, which is incorporated by this reference.

TECHNICAL FIELD

Disclosed are embodiments related to network slice based admission control.

BACKGROUND

A network infrastructure can support multiple different network slices. A network slice is a logical network that is typically designed for a specific purpose. For some network slices there is a limit on the number of sessions (e.g., Packet Data Unit (PDU) sessions) that the network slice can serve.

SUMMARY

In a Third Generation Partnership Project (3GPP) Fifth Generation (5G) network, a Session Management Function (SMF), in cooperation with a Network Slice Access Control Function (NSCAF), can enforce this session limit. But certain challenges presently exist. For example, currently there is no mechanism to accurately keep track of the number of sessions (e.g., PDU sessions or Packet Data Network (PDN) connections) for Network Slice Admission Control (NSAC) purposes.

Accordingly, in one aspect there is provided a method performed by a management function (MF) (e.g., SMF or SMF+PGW-C). In one embodiment the method includes the MF determining whether or not to trigger a NSACF procedure. The method also includes, after determining to trigger the procedure, the MF transmitting a first request message to an NSACF, the first request message comprising: i) a network slice ID, ii) a UE ID, and iii) a first session ID (e.g., a PDU session ID or a PDN connection ID). The method also includes the MF receiving a response message transmitted by the NSACF.

In another aspect there is provided a method performed by an NSACF. In one embodiment the method includes the NSACF receiving a request message transmitted by a management function (MF), the request message comprising: i) a network slice ID, ii) a UE ID, and iii) a first session ID. The method also includes the NSACF processing the request message. The method also includes the NSACF transmitting to the MF a response message responsive to the request message.

In another aspect there is provided a computer program comprising instructions which when executed by processing circuitry of a network node causes the network to perform any of the methods disclosed herein. In one embodiment, there is provided a carrier containing the computer program wherein the carrier is one of an electronic signal, an optical signal, a radio signal, and a computer readable storage medium. In another aspect there is provided a network node that is configured to perform the methods disclosed herein. The network node may include memory and processing circuitry coupled to the memory.

An advantage of the embodiments disclosed herein is that they enable a correct accounting of sessions established for admission purposes.

BRIEF DESCRIPTION OF THE DRAWINGS

The accompanying drawings, which are incorporated herein and form part of the specification, illustrate various embodiments.

DETAILED DESCRIPTION

Figure 1:
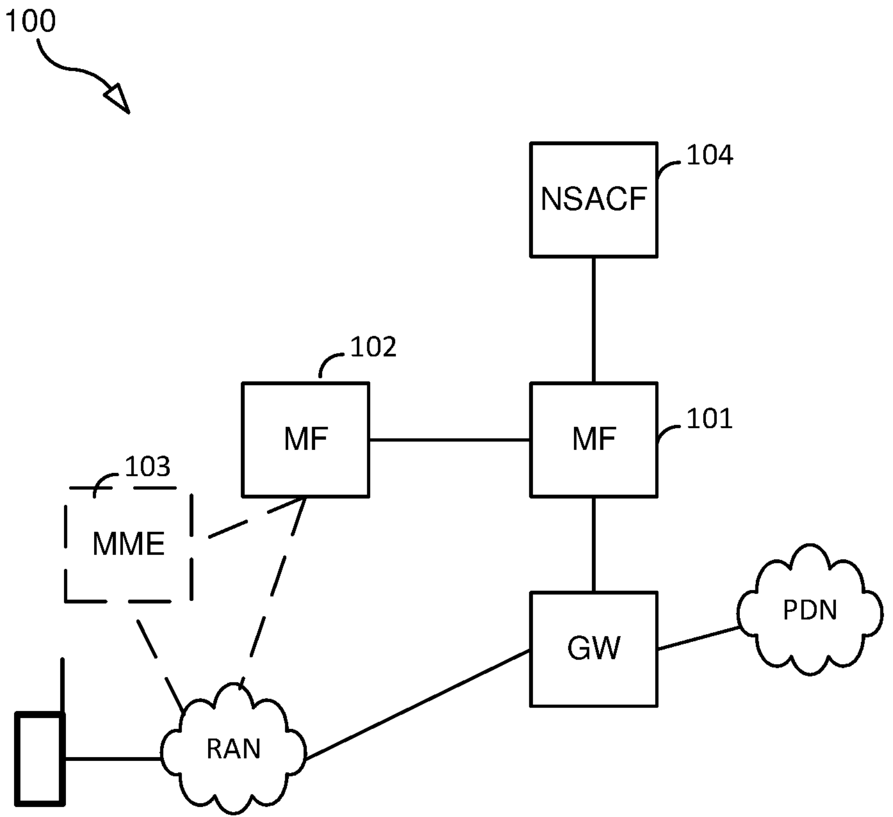
FIG. 1 illustrates some network functions of a 5G network.

FIG. 1 illustrates a network 100 according to some embodiments. As illustrated in FIG. 1, network 100 includes a first management function (MF) 101 (e.g., if network 100 is a 5G Core Network (CN), then MF 101 may be a Session Management Function (SMF); and if network 100 is a combined 4G/5G CN, then MF 101 may be a SMF+PGW-C). Network 100 also includes: a second MF 102 (e.g., MF 102 may be a 5G Access and Mobility Management Function (AMF) or a 4G Serving Gateway (SGW)): a gateway (GW) (e.g., a 5G User Plane Function (UPF)); and a Network Slice Admission Control Function (NSACF) 104. As further shown in FIG. 1, the network 100 enables a user equipment (UE) to access a packet data network (e.g., the Internet) via a radio access network (RAN) and the GW. As also shown in FIG. 1, in some embodiments (e.g., embodiments in which the RAN is a 4G RAN), network 100 also includes a Mobility Management Entity 103—in such an embodiment, MF 102 is an SGW and MF 101 is a SMF+PGW-C). MF 101 supports different functionalities, e.g. MF 101 receives rules from a policy function and configures the GW accordingly. Additionally, MF 101, in coordination with NASCF 104, enforces the session limit described above.

1. Services Provided by NSACF

The NSACF 104 provides services to control the number of sessions with a network slice for network slices subject to NSAC. The MF 101 can request the NSACF to check whether the number of sessions (e.g., PDU session or PDN connections) established on a network slice has reached the maximum number of sessions per network slice and the MF 101 can also request the NSACF to update the number of sessions established on a network slice.

More specifically, the NSACF provides a serviced named "Nnsacf_NumberOfPDUsPerSliceAvailabilityCheckAndUpdate."

This service can be invoked by MF 101 to update (i.e., increase or decrease) the number of sessions established on a network slice. MF 101 invokes the service by transmitting a Nnsacf_NumberOfPDUsPerSliceAvailabilityCheckAndUpdate message to the NSACF. Also, if the number of sessions on the network slice is to be increased, the NSACF first checks whether the number of the sessions established on that network slice has reached the maximum number of sessions per network slice threshold. If the maximum number of sessions on the network slice has already been reached, the session establishment procedure is rejected.

The required inputs are: a Single-Network Slice Selection Assistance Information (S-NSSAI), which uniquely identifies a network slice (accordingly the term network slice and S-NSSAI may be used interchangeably), a UE identifier (ID), and a session ID. Optional inputs include an update flag and a second session ID. The S-NSSAI parameter identifies the network slice for which the number of sessions established on a network slice is to be updated. The UE ID is used by the NSACF to maintain a list of UE IDs that has established sessions with the network slice. The session ID is used by the NSACF to maintain for each UE ID, the session ID(s) for established sessions. The update flag optional input parameter indicates whether the number of the sessions established on that network slice is to be increased, for example at session establishment procedure, or decreased, for example at session release procedure. The second session ID replaces an existing session ID for the UE.

The output of the service is the maximum number of sessions per network slice reached and availability status.

2. Number of Sessions Per Network Slice Availability Check and Update Procedure:

The number of sessions per network slice availability check and update procedure is invoked to check or update (i.e., increase or decrease) the number of sessions established on a network slice that is subject to NSAC (the network slice is uniquely identified by S-NSSAI). MF 101 is configured with the information indicating which network slice(s) is/are subject to NSAC.

Figure 2:
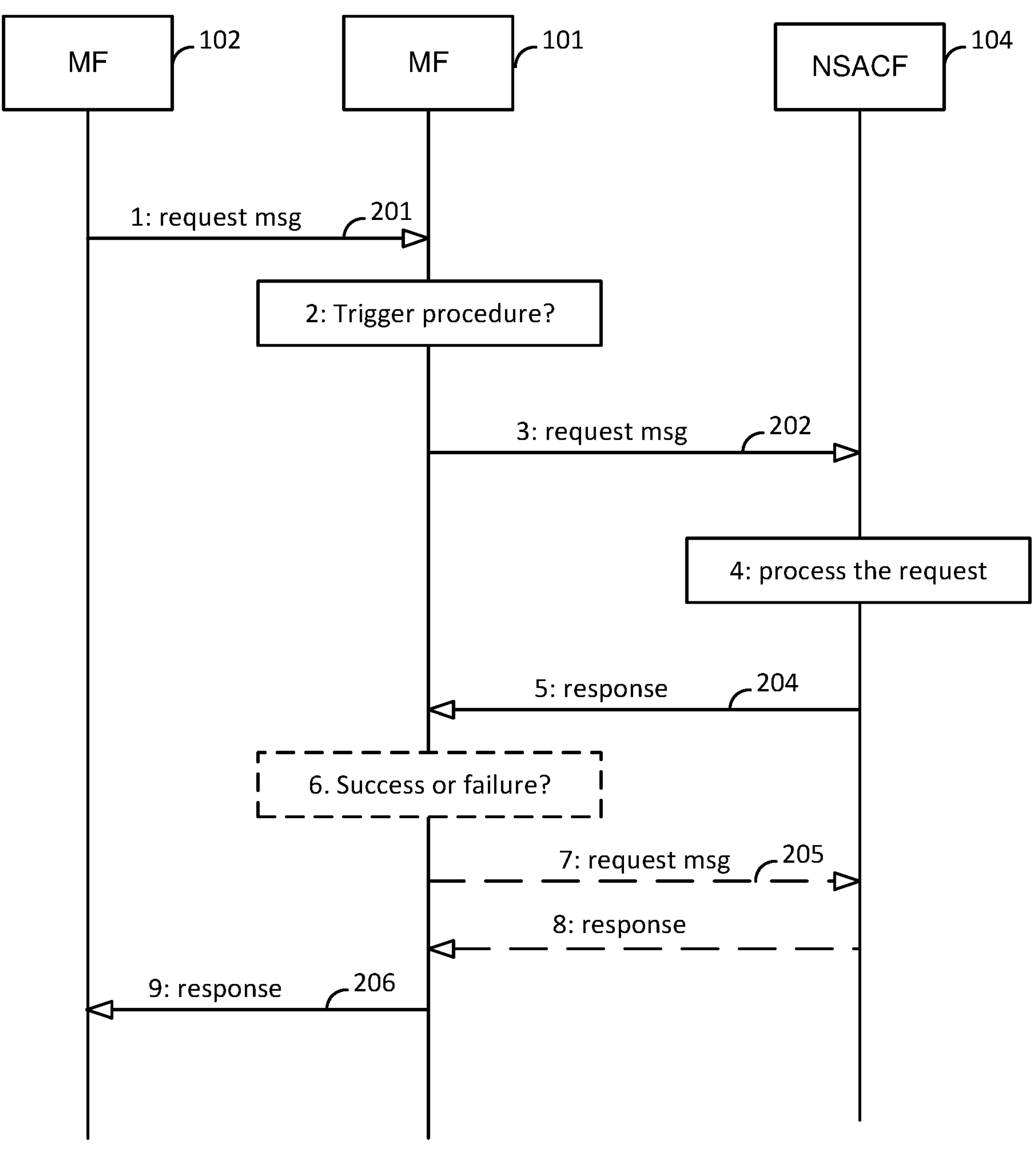
FIG. 2 illustrates a message flow according to some embodiments.

FIG. 2 is a message flow diagram illustrating the availability check and update procedure.

Step 1: The MF 101 (which may be an anchor SMF) receives a request message 201 transmitted by MF 102 (e.g., which may be an AMF). In some embodiments, request message 201 includes the following parameters: 1) a request type indicator indicating a request type (e.g., the request type may indicate whether a UE is requesting establishment of new session): 2) a UE ID (e.g., a Subscription Permanent Identifier (SUPI)): 3) a network slice identifier (e.g., S-NSSAI); and 4) a session ID. In embodiments where MF 101 is an SMF and MF 102 is an AMF, request message 201 may be, for example: 1) the Nsmf_PDUSession_CreateSMContext Request message: 2) the Nsmf_PDUSession_Create Request message: 3) the Nsmf_PDUSession_UpdateSMContext message: or 4) the Nsmf_PDUSession_Release Request message. In embodiments where MF 101 is an SMF+PGW-C and MF 102 is a SGW, request message 201 may be a Create Session Request.

Step 2: The anchor MF 101 determines whether or not to trigger (i.e., initiate) the number of sessions per network slice availability check and update procedure. In one embodiment, this determination is based on the information included in request message 201. For example, if the network slice ID identifies a network slice that is subject to NSAC and if the request type value included in message 201 indicates that a new session is being requested, then MF 101 will determine that it needs to initiate the procedure. Additionally, if the request message is request for releasing a session and includes a network slice identifier that identifies a network slice subject to NSAC, then MF 101 will determine that it needs to initiate the procedure. However, if, for example, the request type indicates "Existing PDU Session" for handover purposes, then MF 101 will not initiate the procedure.

Step 3: As a result of determining to trigger the procedure, the MF 101 sends to the NSACF 104 a request message 202 (e.g., the "Nnsacf_NumberOfPDUsPerSliceAvailabilityCheckAndUpdate_Request" message). The MF 101 includes at least the following in the request message 202: a UE ID, network slice ID, and at least a first session ID that identifies the session to be established. MF 101 may obtain these parameters from the request message 201. In some embodiments, when request message includes the first session ID and a second session ID that is to be replaced the first session ID, then MF 101 also includes the second session ID in request message 202, otherwise MF 101 includes an update flag in request message 202. The value of the update flag included in request message 202 will depend on whether a session is being established or released, which MF 101 can determine based on the request type. For example, if a session is being established the flag may be set to 1, which indicates to NSACF to increment its session counter associated with the network slice ID, otherwise it is set to 0, which indicates to NSACF to decrement the session counter associated with the network slice ID.

Step 4: After receiving the request message 202, the NSACF 104 process the request message 202. That is, for example, NSACF determines whether the request message includes the update flag, and, if so, checks the value of the update flag and performs accordingly.

That is, if the update flag is present and indicates increase (e.g. flag=1), and the maximum number of sessions established on the network slice has already been reached, then the NSACF 104 transmits (see step 5) to the MF 101 a response message 204 (e.g., the "Nnsacf_NumberOfPDUsPerSliceAvailabilityCheckAndUpdate_Response" message) indicating that the maximum number of sessions per network slice has been reached; on the other hand, if the maximum number of sessions established on the network slice has not been reached, then the NSACF 104 performs the following steps: first, the NSACF increases the number of sessions for that network slice; second, the NSACF 104 determines whether or not it has a stored data record for the UE ID included in the message, and, if it does have a stored data record for the UE ID, then the NSACF 104 adds to the data record a PDU ID entry containing the session ID that is included in message 202, otherwise the NSACF creates a data record for the UE ID and adds to the data record a PDU ID entry containing the session ID that is included in message 202; and third, the NSACF 104 transmits the response message 204, which in this case indicates a successful outcome.

If, on the other hand, the update flag parameter is present and indicates decrease the current number of sessions per network slice (e.g., update flag=0), then the NSCAF 104 locates the stored data record tied to the UE ID included in the message 202, removes from the data record the session ID entry matching the session ID included in the message 202, decreases the number of sessions for that network slice, and transmits the response message 204, which in this case indicates a successful outcome.

If the update flag parameter is absent, the NSACF 104 locates a stored data record tied to the UE ID included in the message 202 (e.g. NSACF locates a data record having a value in a key field that matches the UE ID included in the message 202), replaces a session ID that is included in the data record and that matches a session ID (e.g. the second session ID, which is the old session ID) included in message 202 with another session ID (e.g. the first session ID, which is the new session ID) included in message 202, and transmits the response message 204, which in this case indicates a successful outcome.

Step 5: MF 101 receives the response message 204. If response message 204 indicates that the maximum number of sessions per network slice has been reached, then the MF 101 rejects the session establishment request with maximum number of sessions per network slice reached reject cause.

Step 6 (optional): If request message 201 indicates establishment of session, then in step 6 MF 101 determines whether or not the session establishment has succeeded. If it has not succeeded due reasons unrelated to the maximum number of PDU sessions established for the network slice, then MF 101 performs step 7.

Step 7 (optional): MF 101 sends to NSACF 104 a second request message (request message 205) comprising the UE ID, the network slice ID and session ID that was included in request message 202, but the update flag in message 205 will be set to cause NSACF to decrement the session counter associate with the network slice ID (in contrast, the update flag in message 202 was set to cause NSACF to increment the counter). In this way, NSACF will have an accurate count of the number of established session for the network slice identified by the network slice ID.

Step 8 (optional): MF 101 receives a response message transmitted by NSACF 104 in response to message 205.

Step 9: MF 101 sends to MF 102 a response message 206 that is responsive to request message 201.

Figure 3:
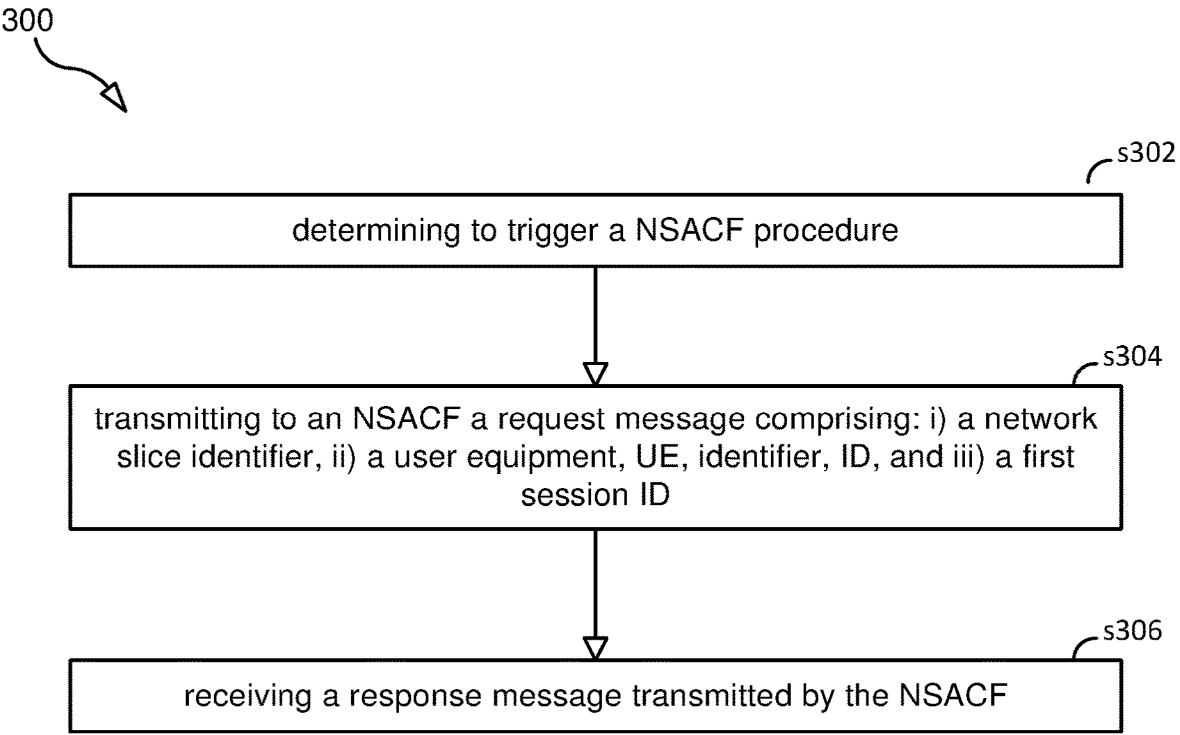
FIG. 3 is a flowchart illustrating a process according to some embodiments.

FIG. 3 is a flowchart illustrating a process 300. The process 300 is performed by MF 101. Process 300 may begin in step s302. Step s302 comprises MF 101 determining to trigger a network slice access control function (NSACF) procedure. Step s304 comprises the MF 101, after determining to trigger the NSACF procedure, transmitting request message 202 to NSACF 104, the request message comprising: i) a network slice identifier, ii) UE ID and iii) a session ID. In some embodiments, the request message further comprises at least one of an update flag or a second session ID. Step s306 comprises the MF 101 receiving response message 204 transmitted by the NSACF 104.

Figure 4:
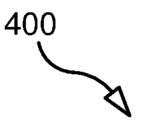
FIG. 4 is a flowchart illustrating a process according to some embodiments.
Figure 4:
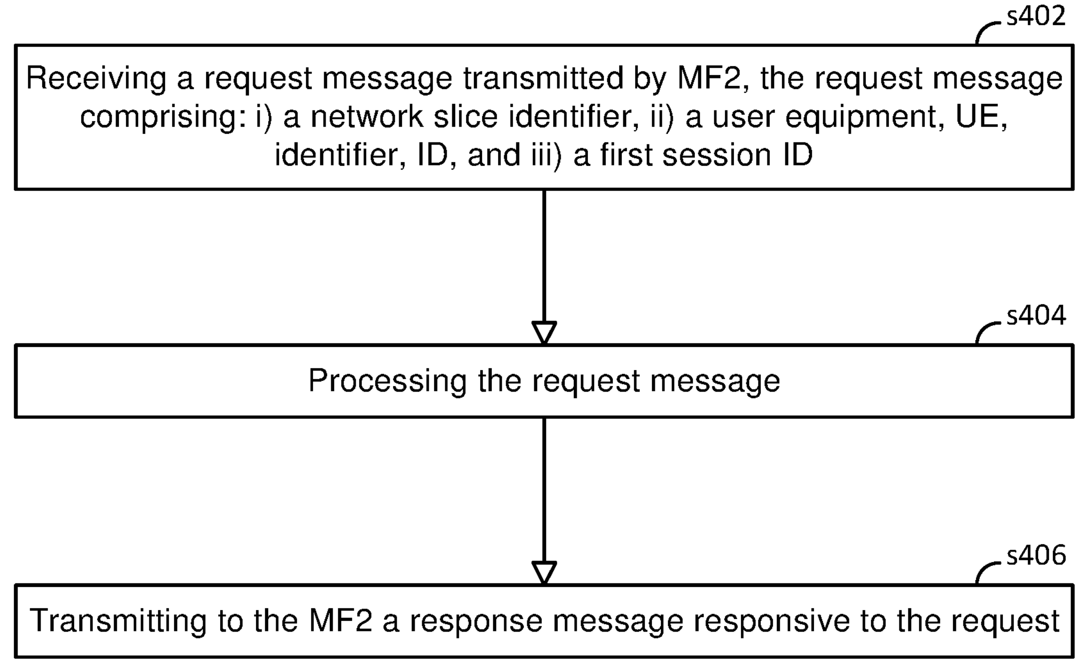

FIG. 4 is a flowchart illustrating a process 400. The process 400 is performed by NSACF 104. Process 400 may begin in step s402. Step s402 comprises NSACF 104 receiving request message 202 transmitted by MF 101, the request message comprising: i) a network slice identifier, ii) UE ID, and iii) a session ID. In some embodiments, the request message further comprises at least one of an update flag or a second session ID. Step s404 comprises the NSACF 104 processing the request message. Step s406 comprises transmitting to the MF response message 204 responsive to the request message 202.

Figure 5:
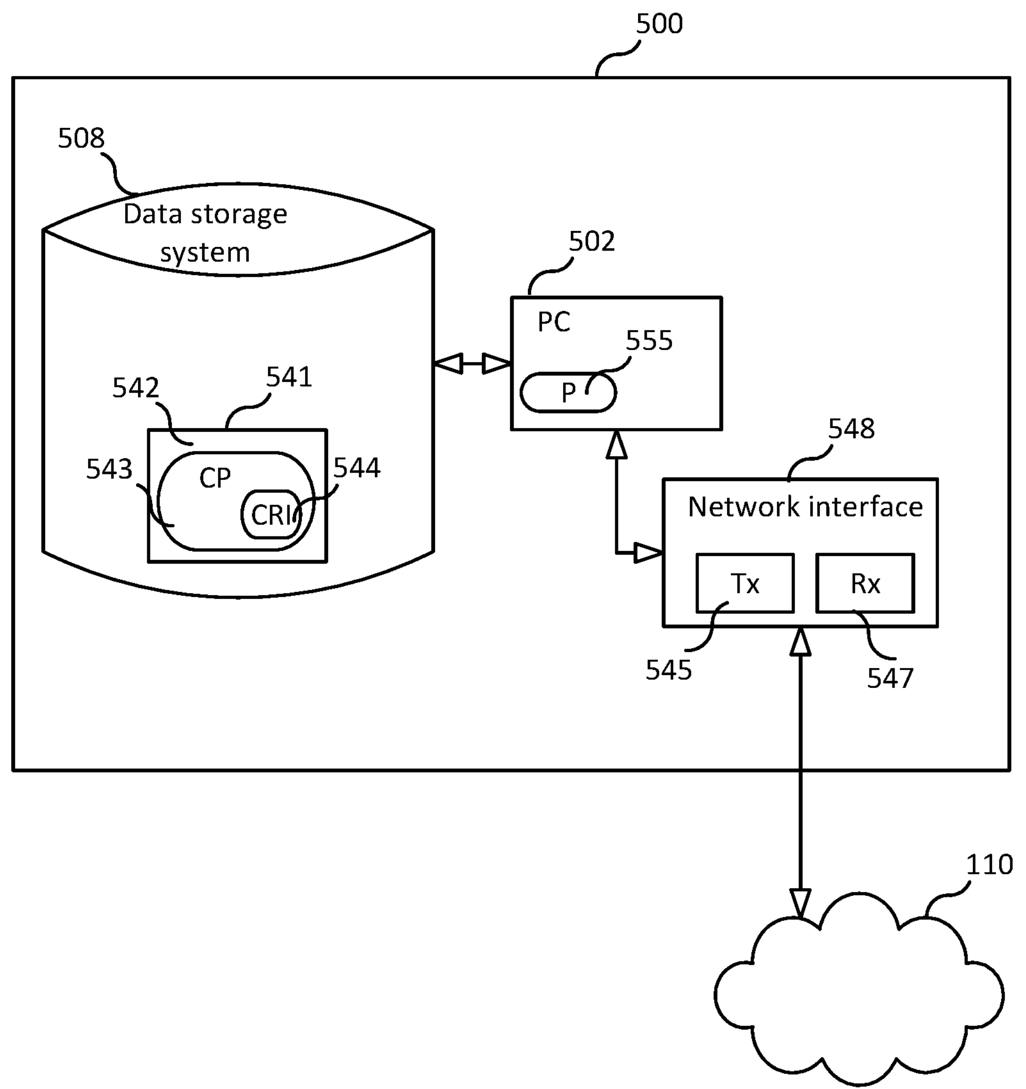
FIG. 5 shows a network node according to some embodiments.

A network function can be implemented either as a network element on a dedicated hardware, as a software instance running on a dedicated hardware, or as a virtualised function instantiated on an appropriate platform, e.g. on a cloud infrastructure. FIG. 5 is a block diagram of a network node 500, according to some embodiments, which can implement any network function including, for example, MF 101 or NSACF 104. As shown in FIG. 5, network node 500 may comprise: processing circuitry (PC) 501, which may include one or more processors (P) 555 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node 500 may be a distributed computing apparatus): at least one network interface 548 comprising a transmitter (Tx) 545 and a receiver (Rx) 547 for enabling network node 500 to transmit data to and receive data from other nodes connected to a network 110 (e.g., an Internet Protocol (IP) network) to which network interface 548 is connected (directly or indirectly) (e.g., network interface 548 may be wirelessly connected to the network 110, in which case network interface 548 is connected to an antenna arrangement); and a storage unit (a.k.a., "data storage system") 508, which may include one or more non-volatile storage devices and/or one or more volatile storage devices. In embodiments where PC 501 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 501, the CRI causes network node 500 to perform steps described herein (e.g., steps described herein with reference to the flow charts). In other embodiments, network node 500 may be configured to perform steps described herein without the need for code. That is, for example, PC 501 may consist merely of one or more ASICs. Hence, the features of the embodiments described herein may be implemented in hardware and/or software.

SUMMARY OF VARIOUS EMBODIMENTS

- A1. A method (300) performed by a first management function (101) (e.g., SMF or SMF+PGW-C), the method comprising: determining (s302) whether or not to trigger a network slice access control function, NSACF, procedure: after determining to trigger the procedure, transmitting (s304) a first request message (202) to an NSACF (104), the first request message comprising: i) a network slice identifier, ID, ii) a user equipment, UE, ID, and iii) a first session ID (e.g., a PDU session ID or a PDN connection ID); and receiving (s306) a response message (204) transmitted by the NSACF.
- A2. The method of embodiment A1, wherein the first request message further comprises at least one of an update flag or a second session ID.
- A3. The method of embodiment A1 or A2, further comprising, prior to determining whether or not to trigger the NSACF procedure, receiving a request message (201) transmitted by a second management function, MF (102), wherein the determination is based on information included in the request message (201) transmitted by the second MF.
- A4. The method of embodiment A3, wherein determining whether or not to trigger the NSACF procedure comprises determining whether the request message (201) transmitted by the second MF (102) is requesting establishment of session for a network slice that is subject to network slice access control, NASC.
- A5. The method of embodiment A3 or A4, further comprising determining whether or not to include the update flag in the first request message.
- A6. The method of embodiment A5, wherein determining whether or not to include the update flag in the first request message comprises determining whether the request message transmitted by the second MF includes an old session ID, if the request message transmitted by the second MF includes the old session ID, then the old session ID is included in the first request message but the update flag is not included in the first request message, and if the request message transmitted by the second MF does not include an old session ID, then the update flag is included in the first request message.

B1. A method (400) performed by a network slice access control function, NSACF (104), the method comprising: receiving (s402) a request message (202) transmitted by a management function, MF (101), the request message comprising: i) a network slice identifier, ID, ii) a user equipment, UE, ID, and iii) a first session ID; processing (s404) the request message; and transmitting (s406) to the MF a response message (204) responsive to the request message (202).

B2. The method of embodiment B1, wherein the request message further comprises at least one of an update flag or a second session ID.

B3. The method of embodiment B1, wherein the request message further comprises at least one of an update flag, and the method further comprises: based on the value of the update flag, updating (i.e., incrementing or decrementing) a session counter associated with the network slice ID.

B4. The method of embodiment B3, further comprising: adding the first session ID to a data record identified by the UE ID, or removing the first session ID from a data record identified by the UE ID.

B5. The method of embodiment B1, wherein the request message further comprises a second session ID, and the method further comprises: removing the second session ID from a data record identified by the UE ID; and adding the first session ID to a data record.

C1. A computer program (543) comprising instructions (544) which when executed by processing circuitry (555) of a network node (500) causes the network node to perform the method of any one of embodiments A1-A6 or B1-B5.

C2. A carrier containing the computer program of embodiment C1, wherein the carrier is one of an electronic signal, an optical signal, a radio signal, and a computer readable storage medium (542).

D1. A network node (500) that is configured to perform the method of any one of embodiments A1-A6 or B1-B5.

The following is an excerpt from a change request for suggesting changes to a 3GPP Technical Specification (TS):

Summary of proposed change: the anchor SMF only interacts with the NSCAF for newly initiated PDU sessions and as long as they are not associated with an existing PDU session (SSC mode 3, or Session Handover). This enables SSC mode 3 not to be subject to NSCAF given that the UE has already an established PDU Session. If this change is not approved then incorrect accounting of PDU session established for admission purposes my result.

4.2.11.x Number of PDU Sessions Per Network Slice Availability Check and Update Procedure The number of PDU Sessions per network slice availability check and update procedure is to update (i.e. increase or decrease) the number of PDU Sessions established on S-NSSAI which is subject to NSAC. The SMF is configured with the information indicating which network slice is subject to NSAC.

Figure 6:
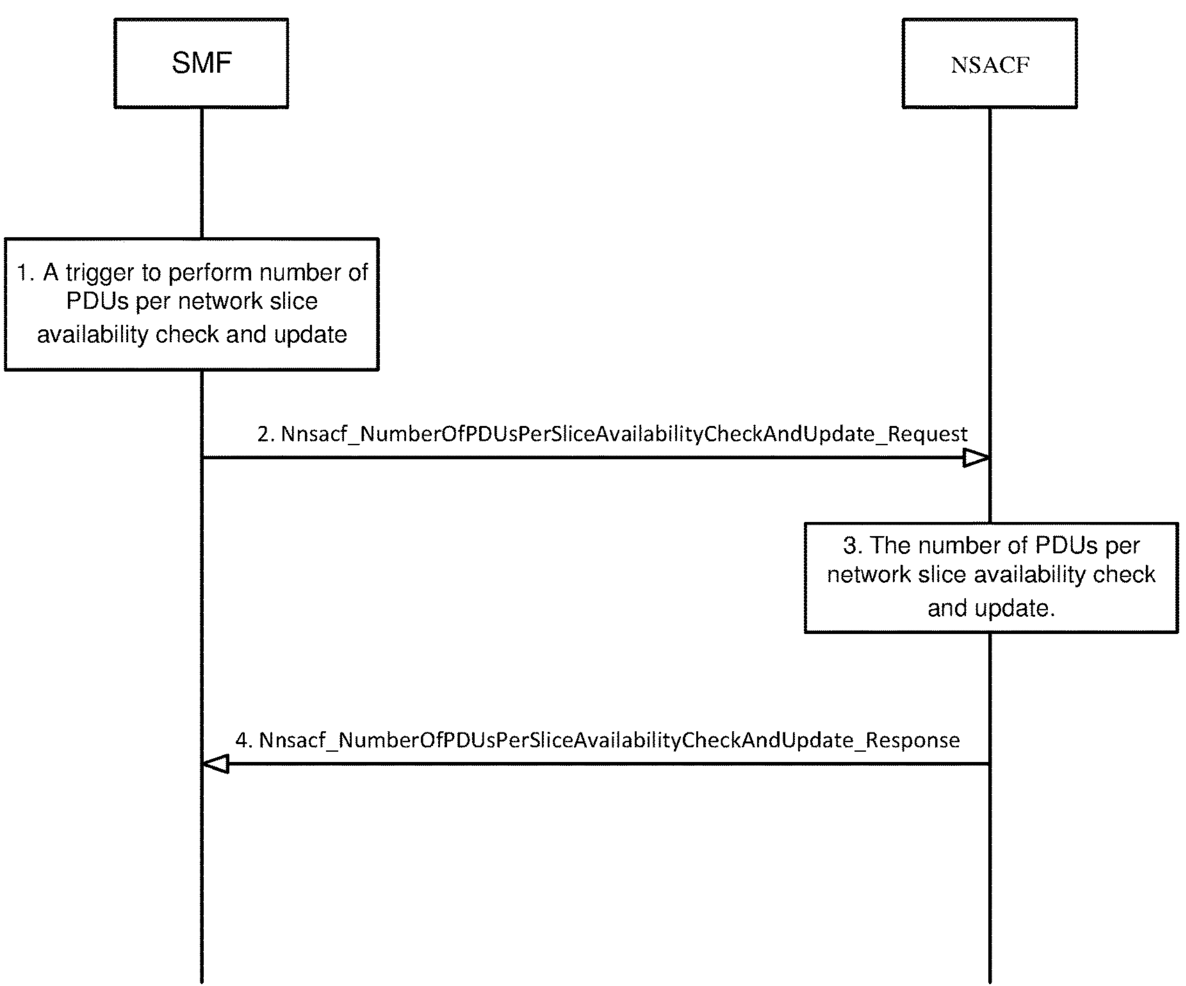
FIG. 6 is a message flow diagram according to an embodiment.

FIG. 6 illustrate the Number of PDU Sessions per network slice availability check and update procedure.

Step 1: The anchor SMF triggers the Number of PDU Sessions per network slice availability check and update procedure for the network slices that are subject to NSAC at the beginning of a PDU Session Establishment procedure (clause 4.3.2.2.1 and clause 4.3.2.2.2) only for new PDU Sessions to be established, and as a last step of successful PDU Session Release procedure (clause 4.3.4.2 and clause 4.3.4.3).

NOTE X: Anchor SMFs handling PDU sessions associated with UE Request Type "Existing PDU Session" for handover purposes do not intereact with the NSCAF.

Step 2: The anchor SMF sends Nnsacf_NumberOfPDUsPerSliceAvailabilityCheckAndUpdate_Request message to the NSACF. The anchor SMF includes in the message the UE ID, S-NSSAI for which the number of PDU Sessions per network slice update is required, the PDU session ID for the session to be established by the PDU, modified PDU session ID when it replaces an existing PDU Session ID for a UE ID, and the update flag which indicates that the number of PDUs established on the S-NSSAI is to be increased if the procedure is triggered at the beginning of PDU Session Establishment procedure or indicates that the number of PDU Sessions on the S-NSSAI is to be decreased if the procedure is triggered at the end of PDU Sessions Release procedure.

Anchor SMFs that receive an old and new PDU Session ID from a UE in support of SSC mode 3, do not provide an update flag, but provides to the NSCAF a PDU Session ID corresponding to the old PDU Session ID received from the UE, and a modified PDU session that corresponds to the new PDU Session ID received from the UE.

An anchor SMF shall not invoke NSCAF for an S-NSSAI subject to NSAC when the PDU session replaces an existing anchor as per clause 4.3.5.4.

Step 3: The NSACF updates the current number of PDU Sessions established on the S-NSSAI, i.e. increase or decrease the number of PDU Sessions per network slice based on the information provided by the anchor SMF in the update flag parameter.

If the update flag parameter from the anchor SMF indicates increase, and the maximum number of PDU Sessions established on the network slice has already been reached, then the NSACF returns a result parameter indicating that the maximum number of PDU Sessions per network slice has been reached. If the maximum number of PDU Sessions established on the network slice has not been reached yet, the NSACF finds the UE ID. If the UE ID is located, the NSACF increases the number of PDU Sessions for that network slice, stores the PDU Session ID. If the NSCAF did not locate the UE ID, it creates an entry for the UE ID, stores the PDU Session ID and increases the number of PDU Sessions for that network slice.

If the update flag parameter from the anchor SMF indicates decrease the current number of PDU Sessions per network slice, NSCAF locates the UE ID, removes the entry associated with the PDU Session ID, and decreases the number of PDU Sessions for that network slice.

If the update flag parameter is absent, the NSCAF locates the UE ID, replaces the existing PDU session ID with the modified PDU Session ID. In this case, the NSCAF returns a successful outcome.

Step 4: The NSACF acknowledges the update to the SMF with Nnsacf_NumberOfPDUsPerSliceAvailabilityCheckAndUpdate_Response message. If the NSACF returned maximum number of PDU Sessions per network slice reached result, the SMF rejects the PDU Session establishment request with maximum number of PDU Sessions per network slice reached reject cause.

In case of a PDU Session Establishment failure, the anchor SMF triggers another request to the NSACF with the update flag parameter equal to decrease in order to re-adjust back the PDU Session counter in the NSACF.

5.2.21 Network Slice Admission Control Function (NSACF) services 5.2.21.1 General The following table illustrates the NSACF services:

TABLE 5.2.21.1-1

List of NSACF services

| Service Name | Service Operations | Operation Semantics | Example Consumer(s) |
|---|---|---|---|
| Nnsacf_NumberOfUEsPerSlice | AvailabilityCheckAndUpdate | Request/Response | AMF |
| | EACNotify | | AMF |
| Nnascf_NumberOfPDUsPerSlice | AvailabilityCheckAndUpdate | Request/Response | SMF |

5.2.21.x Nnsacf_NumberOfPDUsPerSlice services 5.2.21.x.1 General

Service Description: The Nnsacf_NumberOfPDUsPerSlice services control the number of PDU Sessions with a network slice for the network slices subject to NSAC. The SMF can request the NSACF to check whether the number of PDU Sessions established on a network slice has reached the maximum number of PDU Sessions per network slice and the SMF can also request the NSACF to update the number of PDU Sessions established on a network slice.

5.2.xx.x.2 Nnsacf_NumberOfPDUsPerSliceAvailabilityCheckAndUpdate service operation Service Operation name: Nnsacf_NumberOfPDUsPerSliceAvailabilityCheckAndUpdate Description: Updates the number of PDU Sessions established on a network slice (e.g. increase or decrease). Also, if the number of PDU Sessions on the network slice is to be increased, the NSACF first checks whether the number of the PDU Sessions on that network slice has reached the maximum number of PDU Sessions per network slice threshold. If the maximum number of PDU Sessions on the network slice has already been reached, the PDU Session Establishment procedure is rejected.

Inputs, Required: S-NSSAI, UE ID, PDU Session ID.

The S-NSSAI parameter is the network slice for which the number of PDU Sessions established on a network slice is to be updated.

The UE ID is used by the NSACF to maintain a list of UE IDs that has established PDU sessions with the network slice.

PDU Session ID is used by the SNACF to maintain for each UE ID, the PDU Session ID(s) for established PDU Sessions.

Inputs, Optional: update flag, Modified PDU Session ID.

The update flag input parameter indicates whether the number of the PDU Sessions established on that network slice is to be increased, for example at PDU Session Establishment procedure or decreased, for example at PDU Session Release procedure.

Modified PDU session ID replaces an existing PDU Session ID for a UE ID with the modified PDU Session ID Outputs, Required: maximum number of PDU Sessions per network slice reached, availability status.

CONCLUSION

While various embodiments are described herein, it should be understood that they have been presented by way of example only, and not limitation. Thus, the breadth and scope of this disclosure should not be limited by any of the above described exemplary embodiments. Moreover, any combination of the above-described embodiments in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a first management function, the method comprising:

determining to trigger a network slice access control function (NSACF) procedure;

after determining to trigger the procedure, transmitting a first request message to an NSACF, the first request message comprising: i) a network slice identifier (ID), ii) a user equipment (UE) ID, iii) a session ID, and iv) an update flag; and receiving a response message transmitted by the NSACF, wherein determining to trigger the NSACF procedure comprises:

determining that the session ID is for a new session to be established; and determining that the network slice identifier is for a network slice subject to network slice access control (NSAC), and the update flag is set to a value that triggers the NSACF to check whether a maximum number of sessions established on the network slice has already been reached.

2. The method of claim 1, wherein the method further comprises, prior to determining to trigger the procedure, receiving a session establishment request message comprising the session ID and an indicator indicating that the session ID is for a new session to be established.

3. The method of claim 1, wherein the method further comprises, prior to determining to trigger the NSACF procedure, receiving a request message transmitted by a second management function (MF), and the determination to trigger the NSACF procedure is based on information included in the request message transmitted by the second MF.

4. The method of claim 2, wherein the response message comprises a result parameter indicating that maximum number of sessions established on the network slice has already been reached.

5. The method of claim 4, wherein the method further comprises rejecting the session establishment request as a result of determining that the result parameter indicating that maximum number of sessions established on the network slice has already been reached.

6. The method of claim 5, wherein the first management function is a session management function (SMF).

7. A method performed by a network slice access control function (NSACF), the method comprising:

receiving a request message transmitted by a management function (MF), the request message comprising: i) a network slice identifier (ID) for a network slice, ii) a user equipment (UE) ID, iii) a session ID, and iv) an update flag;

processing the request message; and transmitting to the MF a response message responsive to the request message, wherein processing the request message comprises:

determining that the update flag is set to a first value; and as a result of determining that the update flag is set to the first value:

checking whether a maximum number of sessions established on the network slice has already been reached, or locating the UE ID and, after locating the UE ID, decreasing the number of sessions for the network slice.

8. The method of claim 7, wherein the first value indicates to increase the number of sessions for the network slice, and processing the request message comprises determining whether a maximum number of sessions established on the network slice has already been reached as a result of determining that the update flag is set to the first value.

9. The method of claim 8, wherein processing the request message further comprises, after determining that the maximum number of sessions established on the network slice has not already been reached, increasing a session counter associated with the network slice.

10. The method of claim 9, wherein processing the request message further comprises, after determining that the maximum number of sessions established on the network slice has not already been reached, storing the session ID in a data record associated with the UE ID.

11. The method of claim 7, wherein the first value indicates to decrease the number of sessions for the network slice, and processing the request message comprises:

locating the UE ID and, after locating the UE ID, decreasing the number of sessions for the network slice as a result of determining that the update flag is set to the first value; and removing the session ID from a data record associated with the UE ID.

12. A non-transitory computer readable storage medium storing a computer program comprising instructions which when executed by processing circuitry of a network node causes the network node to perform the method of claim 1.

13. A non-transitory computer readable storage medium storing a computer program comprising instructions which when executed by processing circuitry of a network node causes the network node to perform the method of claim 7.

14. A network node, the network node comprising:

a receiver; and processing circuitry comprising a processor, wherein the network node is configured to perform a method comprising:

determining to trigger a network slice access control function (NASCF) procedure;

after determining to trigger the procedure, transmitting a first request message to an NSACF, the first request message comprising: i) a network slice identifier (ID), ii) a user equipment (UE) ID, iii) a session ID, and iv) an update flag; and employing the receiver to receive a response message transmitted by the NSACF, wherein determining to trigger the NSACF procedure comprises:

determining that the session ID is for a new session to be established; and determining that the network slice identifier is for a network slice subject to network slice access control (NSAC), and the update flag is set to a value that triggers the NSACF to check whether a maximum number of sessions established on the network slice has already been reached.

15. The network node of claim 14, wherein the method further comprises, prior to determining to trigger the procedure, receiving a session establishment request message comprising the session ID and an indicator indicating that the session ID is for a new session to be established.

16. A network node, the network node comprising:

a transmitter;

a receiver; and processing circuitry comprising a processor, wherein the network node is configured to perform a method comprising:

employing the receiver to receive a request message transmitted by a management function (MF), the request message comprising: i) a network slice identifier (ID) for a network slice, ii) a user equipment (UE) ID, iii) a session ID, and iv) an update flag;

processing the request message; and employing the transmitter to transmit to the MF a response message responsive to the request message, wherein processing the request message comprises:

determining that the update flag is set to a first value; and as a result of determining that the update flag is set to the first value:

checking whether a maximum number of sessions established on the network slice has already been reached, or locating the UE ID and, after locating the UE ID, decreasing the number of sessions for the network slice.

17. The network node of claim 16, wherein the first value indicates to increase the number of sessions for the network slice, and processing the request message comprises determining whether a maximum number of sessions established on the network slice has already been reached as a result of determining that the update flag is set to the first value.

18. The network node of claim 16, wherein processing the request message further comprises, after determining that the maximum number of sessions established on the network slice has not already been reached, increasing a session counter associated with the network slice.

19. The method network node of claim 18, wherein processing the request message further comprises, after determining that the maximum number of sessions established on the network slice has not already been reached, storing the session ID in a data record associated with the UE ID.

20. The network node of claim 14, wherein the method further comprises, prior to determining to trigger the NSACF procedure, receiving a request message transmitted by a second management function (MF), and the determination to trigger the NSACF procedure is based on information included in the request message transmitted by the second MF, wherein the response message comprises a result parameter indicating that maximum number of sessions established on the network slice has already been reached.

* * * * *